United States Patent [19]

Carvalho

[11] Patent Number: 4,893,989
[45] Date of Patent: Jan. 16, 1990

[54] VARIABLE PROPELLER SYSTEM INCORPORATING A FORWARD TRANSFER BEARING

[75] Inventor: Paul A. Carvalho, Westfield, Mass.

[73] Assignee: United Technologies Corporation, Hartford, Conn.

[21] Appl. No.: 320,690

[22] Filed: Mar. 7, 1989

[51] Int. Cl.⁴ .............................................. B63H 3/08
[52] U.S. Cl. ................................. 416/157 R; 416/48
[58] Field of Search ............... 416/157 R, 156, 46–49

[56] References Cited

U.S. PATENT DOCUMENTS

| | | | |
|---|---|---|---|
| 2,244,770 | 6/1941 | Englesson | 416/48 X |
| 2,781,856 | 2/1957 | Danvers et al. | 416/48 X |
| 2,958,381 | 11/1960 | Stevens et al. | 416/48 X |
| 2,995,190 | 8/1961 | Chilman | 416/157 R X |
| 3,263,754 | 8/1966 | Belliere | 416/157 R |
| 3,389,641 | 6/1968 | Barnes | 416/46 X |
| 3,560,108 | 2/1971 | Lindahl | 416/154 X |
| 3,603,697 | 9/1971 | Lane | 416/33 |
| 3,664,762 | 5/1972 | Lachnit | 416/156 |
| 4,563,940 | 1/1986 | Wührer | 416/157 R X |
| 4,781,533 | 11/1988 | Andersson | 416/48 X |

FOREIGN PATENT DOCUMENTS

| | | | |
|---|---|---|---|
| 1083482 | 1/1955 | France | 416/49 |
| 160105 | 5/1983 | German Democratic Rep. | 416/157 R |
| 904744 | 8/1962 | United Kingdom | 416/157 R |
| 86/02901 | 5/1986 | World Int. Prop. O. | 416/157 R |

Primary Examiner—Everette A. Powell, Jr.
Attorney, Agent, or Firm—Lloyd D. Doigan

[57] ABSTRACT

Hydraulic fluid is input to a transfer tube of a variable pitch propeller system forward of a rotatable portion of a controller. A transfer bearing is provided about the drive shaft to transfer hydraulic fluid therethrough and between the drive shaft and the transfer tube to transfer hydraulic fluid from the drive shaft into the transfer tube, such transfer bearing allowing relative rotation between the housing and the drive shaft and between the drive shaft and the transfer tube. The transfer tube is slideably connected to the rotatable portion of the controller.

6 Claims, 2 Drawing Sheets

VARIABLE PROPELLER SYSTEM INCORPORATING A FORWARD TRANSFER BEARING

DESCRIPTION

1. Technical Field

This invention relates to a means for transmitting an hydraulic signal across a rotating gap in a variable pitch propeller systems.

2. Background Art

Variable pitch propeller systems include a stationary side and a rotating side separated by a rotation gap. The stationary side includes a housing, a controller, an engine and a gearbox. The rotating side includes a hub, which has a plurality of variable pitch propeller blades mounted thereto, a drive shaft, and a pitch control mechanism, which sets the pitch of the variable pitch blades. The controller, which includes a portion which rotates with the rotating side, sends signals across the rotation gap to the pitch control mechanism to set the pitch of the propeller blades. An example of such a system is disclosed in U.S. Pat. No. 4,523,891 to Schwartz et al, such patent being commonly owned by the Assignee herein. Schwartz et al is hereby incorporated by reference herein.

In Schwartz, signals are sent from the controller to the pitch control mechanism via the relative rotation of a transfer tube which crosses the rotation gap. The relative rotation of the transfer tube positions a valve within the pitch control mechanism. As a result, the valve ports hydraulic fluid, which is supplied by the transfer tube, to a piston. The piston reciprocates selectively in response to the porting of the hydraulic fluid thereto. The reciprocation of the piston sets the pitch of the propeller blades through a connection between the piston and the blades.

The hydraulic fluid is input to the transfer tube via a transfer bearing that is located aft of the rotatable portion of the controller. The transfer tube passes through the rotatable portion of the controller.

Periodically, the controller is removed from the propeller system for maintenance or repair. However, to remove the controller from the system, the transfer tube must be removed or the controller (more particularly, the rotatable portion of the controller) must be slid aft beyond the end of the transfer tube. However, there is not enough space to slide the controller beyond the end of the transfer tube. Moreover, removal of the transfer tube involves removal of the propeller spinner and all the hardware holding the the transfer tube. Such a process is complex, time consuming and costly.

DISCLOSURE OF THE INVENTION

It is an object of the invention to remove the controller of a variable pitch propeller system easily and efficiently.

It is a further object of the invention to remove the controller of the propeller system without removing the transfer tube.

It is a further object of the invention to shorten the transfer tube used in propeller pitch change actuation systems.

According to the invention, hydraulic fluid is input to a transfer tube of a variable pitch propeller system forward of a rotatable portion of a controller. A transfer bearing is provided about the drive shaft to transfer hydraulic fluid therethrough and between the drive shaft and the transfer tube to transfer hydraulic fluid from the drive shaft into the transfer tube, such transfer bearing allowing relative rotation between the housing and the drive shaft and between the drive shaft and the transfer tube. The transfer tube is slideably connected to the rotatable portion of the controller.

By arranging the transfer bearing forward of the rotatable portion of the controller, the controller must slide a relatively short distance off the transfer tube. The distance is controlled only by the length of the connection between the transfer tube and the rotatable portion of the controller. Moreover, the transfer tube length is diminished considerably. Backlash in the transfer of signals across the rotation gap is diminished thereby.

Other features and advantages of the present invention will be apparent from the specification and claims and from the accompanying drawings which illustrate an embodiment of the invention.

BEST MODE FOR CARRYING OUT THE INVENTION

Figure 1:
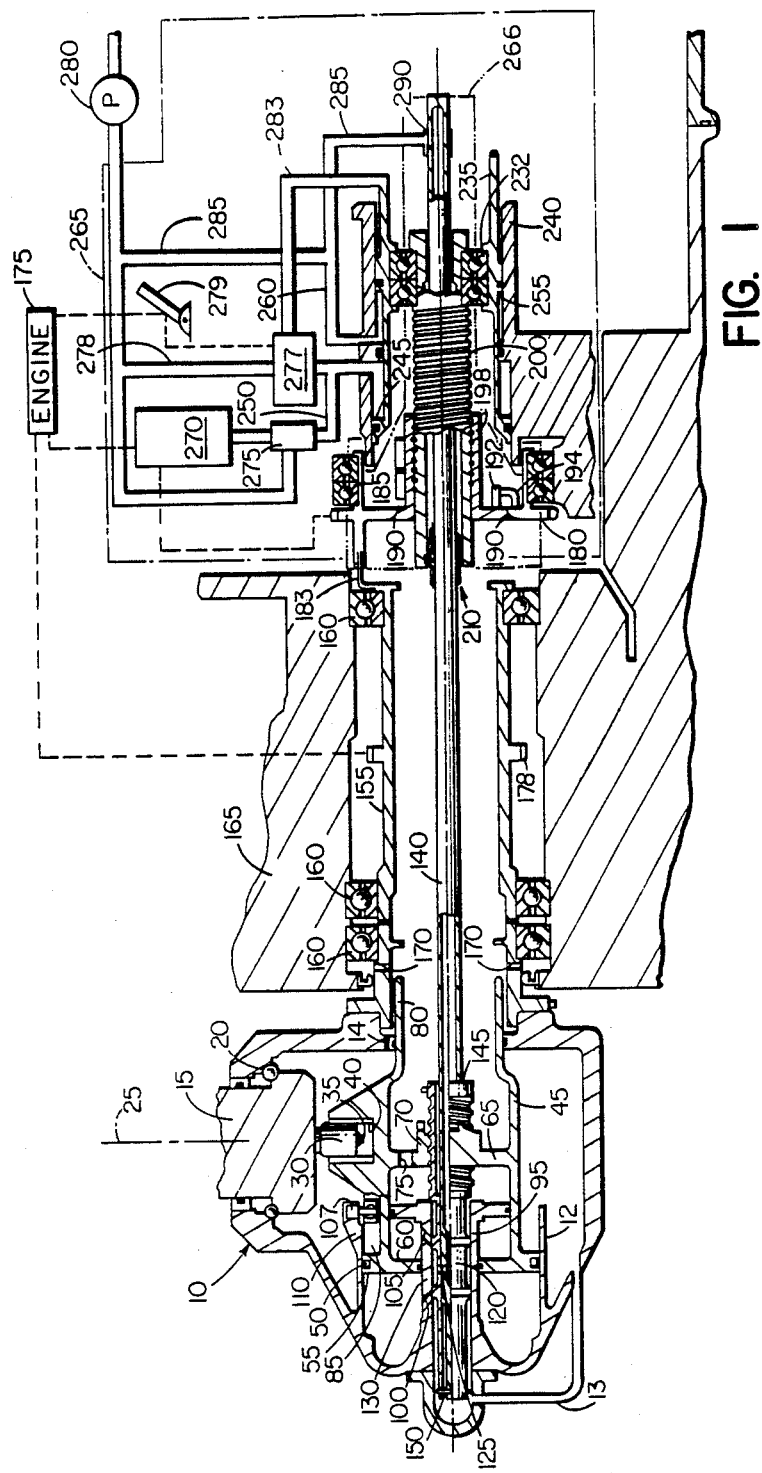
FIG. 1 is a cross-sectional view, partly in section, of variable a prior art pitch propeller system.

Referring to FIG. 1, a variable pitch propeller system as embodied in Schwartz is shown. Schwartz is directed to a system for setting (adjusting) the pitch of the blades of a variable pitch propeller system.

PRIOR ART ENVIRONMENT

Schwartz, which, as noted above has been incorporated by reference herein, has several major components. On its stationary side, Schwartz shows a controller 265, a housing 165, an engine 175 and a gearbox (as indicated by phantom line ). On its rotating side, Schwartz shows a pitch control mechanism, a hub 10, a drive shaft 155 and a transfer tube 140.

The hub 10 has a plurality of propeller blades 15 mounted thereto on bearings 20 so that the blades are pivotably adjustable in pitch about the longitudinal axes 25 thereof. Each blade 15 is positioned via an eccentric roller 30 mounted on a pintle (axle) 35. The roller is manipulated by a piston 45 which forms a portion of the pitch control mechanism.

The pitch control mechanism includes the piston 45, a cylinder 12 in which the piston reciprocates and a valve element 120 connecting to the transfer tube.

The piston 45 includes a forward bulkhead 50 provided with faces 55 and 60 which are selectively pressurized with an hydraulic fluid to move piston 45 and hence propeller blades 15 to desired pitch settings. Piston 45 is provided with an interior bulkhead 65 including a threaded portion 70, an aft skirt portion 80, and a forward longitudinal slot 85.

The cylinder 12 encloses a valve housing 95 which has a pair of outlet ports 100 and 105. Hydraulic fluid pressurizes the interior of cylinder 12 and piston face 55 through port 100, thereby causing movement of the piston to the right with a corresponding blade pitch adjustment. Hydraulic fluid pressurizes the interior of cylinder 12 and piston face 60 through port 105 causing movement of piston 45 to the left with a corresponding blade pitch adjustment.

Valve element 120 selectively meters hydraulic fluid to ports 100 and 105. Valve element 120 includes a radial passage 125 communicating with annular recess 130 that is selectively registrable with ports 100 and 105 as the valve element is longitudinally positioned. The interior portion of valve element 120 is formed integrally with an end portion of a transfer tube 140. An outer portion of the valve element is formed integrally with a screw 145.

The transfer tube 140 is disposed within drive shaft 155 which rotates hub 10. Shaft 155 is mounted on bearings 160 supported on housing 165. Shaft 155 provides rotational input power to hub !0 from an engine 175, the shaft being connected to the engine as, for example, by gear 178 which is fixedly attached to the shaft.

The controller 265 has a rotatable portion 266 and a stationary portion. The rotatable portion includes a ball nut 198 , a ball screw, a gear 180 and a spline and key connection 192, 194. The shaft 155 drives the ball screw and ball nut 198 via shaft extension 183, gear 180, and the spline 192 and key 194 connection. A right-hand portion of transfer tube 140 is received within and rotates with the ball screw via a flexible splined joint 210.

Bearings 185 and 232 separate the rotatable portion 266. of the controller from the stationary portion. The bearings mount the ball screw to the stationary portion so that the ball nut 198, and ball screw, shaft extension 183 and transfer tube 140 are free to rotate with the shaft.

The stationary portion of the controller includes a piston 235, a speed governor 270, a $\beta$-control subsystem 277 and a plurality of hydraulic conduits, as will be discussed infra.

The piston 235 is attached to the bearings 232 and is reciprocably received within stationary cylinder 240. The piston 235 is pressurized at a first surface 245 thereof with metered hydraulic fluid provided thereto through conduit 250, and at a second surface 255 with hydraulic fluid at supply pressure through conduit 260. Pressurization of piston 235 is controlled by any of various known fluid mechanical pitch control systems 265, such as a speed governor 270 and/or a $\beta$-control subsystem 277 which, when activated, meters hydraulic fluid in direct response to the setting of power lever 279 rather than in response to governor 270.

Hydraulic fluid is provided to the controller 265 by pump 280 which draws fluid from a suitable sump (not shown). Fluid at supply pressure is provided by pump 280 to the interior of transfer tube 140 through conduit 285 and transfer bearing 290, the transfer tube ultimately providing the fluid to valve element 120.

Operation of the pitch adjustment system of the present invention is as follows. As required by the governor or $\beta$-control, the pressure of the hydraulic fluid in conduit 250 is adjusted. Such adjustment effects a corresponding adjustment of the position of piston 235 within cylinder 240. The adjustment in position of piston 235 effects a similar adjustment in the longitudinal position of ball screw 200. As the ball screw is moved longitudinally, the engagement thereof with the ball nut 198 , which is longitudinally stationary, effects a rotation of the ball screw. The connection 210 between the ball screw and the transfer tube causes a rotation of the transfer tube and a corresponding rotation of screw 145 within the piston 45. Rotation of screw 145 adjusts the longitudinal position of valve element 120 which ports hydraulic fluid to effect a adjustment in position of the piston 45. Such adjustment of the piston 45 sets the pitch of the propeller blades by means of the connection of roller 30 on the blade root with cam slot 40 in the piston 45.

FORWARD TRANSFER BEARING

Figure 2:
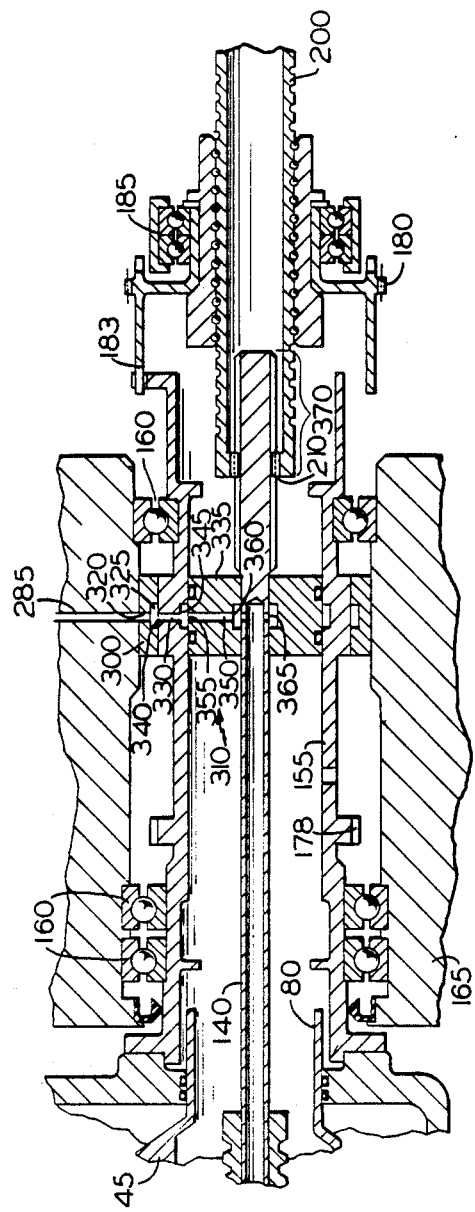
FIG. 2 is a cross-sectional view of a bearing for inserting oil into a transfer tube of FIG. 1.

Referring to FIG. 2, an embodiment of a transfer bearing disposed forward of the rotatable portion 266 of the controller is shown. By placing the transfer bearing forward of the rotatable portion 266 of the controller, the controller may be easily removed form the propeller system by sliding aft off the right hand end portion of the transfer tube and the transfer tube is considerably shortened. It is difficult to locate the transfer bearing forward of the rotatable portion of the control because the transfer tube is located within the drive shaft which is also forward of the rotatable portion of the control. Hydraulic fluid must be delivered to the transfer tube "through" the rotating drive shaft.

The transfer bearing of FIG. 2 has a first portion 300 and a second portion 310. The first portion comprises a first annulus 315 disposed between the drive shaft 155 and the housing 165. The first annulus has an opening 320 for receiving hydraulic fluid from conduit 285 and an annular first groove 325 for transmitting the hydraulic fluid to the drive shaft. The first annulus allows for relative rotation between the the stationary side.(via the housing). The first annulus is sealed by suitable means (snot shown) to prevent leakage between the first annulus and the housing and between the first annulus and the drive shaft.

The second portion 310 is comprised of a first passageway 330 and a second annulus 335. The first passageway, which passes through the drive shaft 155, has an opening 340 communicating with the first groove 325 and an annular second groove 345 for transmitting hydraulic fluid to the second annulus.

The second annulus, which may be fixedly attached to the drive shaft 155 (or transfer tube 140), has a second passageway 350. The second passageway has an opening 355 communicating with the second groove 345 and an annular third groove 360 communicating with the interior of the transfer tube via orifices 365. One of ordinary skill in the art will appreciate that the second annulus may form a portion of the drive shaft 155 or the transfer tube as desired given design requirements.

The transfer bearing allows hydraulic fluid to be inserted to the interior of the transport tube for use with valve element 120 while allowing relative rotation between the drive shaft and the transport tube and between the drive shaft and the stationary side. As noted above the transfer tube rotates relative to the drive shaft to position the valve element 120 in the pitch control mechanism.

By arranging the transfer bearing forward of the rotatable portion 266 of the controller, the controller must slide a relatively short distance off the transfer tube. The distance 370 is controlled only by the length of the connection 210 between the transfer tube and the rotatable portion 266 of the controller. The transfer bearing passes hydraulic fluid "through" the drive shaft. Moreover, the transfer tube length is reduced considerably. Backlash in the transfer of signals across the rotation gap is diminished thereby.

While the present invention has been illustrated and described with respect to a particularly preferred embodiment thereof, it will be appreciated by those of ordinary skill in the art, that various modifications to this invention may be made without departing from the spirit and scope of the present invention.

I claim:

1. In a variable pitch propeller system having a rotating side and a stationary side, the rotating side comprising a hub mounting a plurality of variable pitch propeller blades, a drive shaft, a transfer tube disposed within said drive shaft and rotatable relative thereto, and a hydromechanical pitch change mechanism, the stationary side having a controller and a housing, and a transfer bearing, the controller having a rotatable portion for receiving the transfer tube and imparting rotatable pitch change signals thereto, wherein the improvement comprises:

means for transferring hydraulic fluid from said housing through said drive shaft and through said transfer tube while allowing relative rotation between said housing and said drive shaft and between said drive shaft and said transfer tube, said means being disposed forward of said rotatable portion of said controller.

2. The system of claim 1 wherein said means for transferring comprises:

a first transfer bearing disposed between said drive shaft and said housing, and a second transfer bearing disposed between said drive shaft and said transfer tube.

3. In a variable pitch propeller system having a rotating side and a stationary side, the rotating side comprising a hub mounting a plurality of variable pitch propeller blades, a drive shaft, a transfer tube disposed within said drive shaft and rotatable relative thereto, and a hydromechanical pitch change mechanism, the stationary side having a controller and a housing, and a transfer bearing, the controller having a rotatable portion for receiving the transfer tube and imparting pitch change signals thereto, wherein the improvement comprises:

means for transferring hydraulic fluid from said housing through said drive shaft and through said transfer tube while allowing relative rotation between controller and a housing, and a transfer bearing, the controller having a rotatable portion for receiving the transfer tube and imparting pitch change signals thereto, wherein the improvement comprises:

means for transferring hydraulic fluid from said housing through said drive shaft and through said transfer tube while allowing relative rotation between said housing and said drive shaft and between said drive shaft and said transfer tube.

4. The system of claim 3 wherein said means for transferring comprises:

a first transfer bearing disposed between said drive shaft and said housing, and a second transfer bearing disposed between said drive shaft and said transfer tube.

5. In a variable pitch propeller system having a rotating side and a stationary side, the rotating side comprising a hub mounting a plurality of variable pitch propeller blades, a drive shaft, a transfer tube disposed within said drive shaft and rotatable relative thereto, and a hydromechanical pitch change mechanism, the stationary side having a controller, and a transfer bearing, the controller having a rotatable portion for receiving the transfer tube and imparting rotatable pitch change signals thereto, wherein the improvement comprises:

means for transferring hydraulic fluid through said drive shaft and through said transfer tube while allowing relative rotation between said drive shaft and said transfer tube, said means being disposed forward of said rotatable portion of said controller.

6. The system of claim 5 wherein said means for transferring comprises:

a first transfer bearing for transferring hydraulic fluid to said drive shaft, and a second transfer bearing disposed between said drive shaft and said transfer tube for transferring said hydraulic fluid from said drive shaft to said transfer tube.

* * * * *

UNITED STATES PATENT AND TRADEMARK OFFICE
CERTIFICATE OF CORRECTION

PATENT NO. : 4,893,989
DATED : January 16, 1990
INVENTOR(S) : Paul A. Carvalho

It is certified that error appears in the above-identified patent and that said Letters Patent is hereby corrected as shown below:

Claim 3, line 36, after "imparting" insert --rotatable--.

Claim 3, column 6, lines 1-7, delete "controller and a housing.....
relative rotation between".

Signed and Sealed this

Eleventh Day of December, 1990

Attest:

HARRY F. MANBECK, JR.

*Attesting Officer*    Commissioner of Patents and Trademarks